(12) United States Patent
Hasegawa et al.

(10) Patent No.: US 11,518,441 B2
(45) Date of Patent: Dec. 6, 2022

(54) VEHICLE BODY

(71) Applicant: Honda Motor Co., Ltd., Tokyo (JP)

(72) Inventors: Atsushi Hasegawa, Saitama (JP);
Keiichiro Tsuji, Saitama (JP);
Takayuki Fujii, Saitama (JP);
Norikazu Matsuura, Saitama (JP);
Yusuke Miura, Tokyo (JP); Tomohiro Shimizu, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 89 days.

(21) Appl. No.: 17/198,288

(22) Filed: Mar. 11, 2021

(65) Prior Publication Data
US 2021/0291908 A1  Sep. 23, 2021

(30) Foreign Application Priority Data
Mar. 17, 2020  (JP) .............................. JP2020-046802

(51) Int. Cl.
*B60J 9/00* (2006.01)
*B62D 21/15* (2006.01)
*B60R 19/18* (2006.01)

(52) U.S. Cl.
CPC ............ *B62D 21/152* (2013.01); *B60R 19/18* (2013.01)

(58) Field of Classification Search
CPC ...... H04W 4/70; H04W 4/46; A61K 2300/00; A23V 2002/00; Y02E 60/10; B60R 19/18; B60R 9/06; B60R 2019/1886; B62D 21/152; Y10S 224/924
See application file for complete search history.

(56) References Cited

U.S. PATENT DOCUMENTS

| 4,357,040 | A | * | 11/1982 | Tomioka | ................. | B60J 5/101 |
| | | | | | | 296/207 |
| 4,474,395 | A | * | 10/1984 | Harloff | ................... | B60R 19/18 |
| | | | | | | 293/120 |
| 4,762,352 | A | * | 8/1988 | Enomoto | ................ | B60R 19/18 |
| | | | | | | 293/122 |
| 4,765,665 | A | * | 8/1988 | Akahoshi | ............... | B60R 19/18 |
| | | | | | | 293/121 |
| 4,996,634 | A | * | 2/1991 | Haneda | ................ | B60Q 1/0491 |
| | | | | | | 362/505 |

(Continued)

FOREIGN PATENT DOCUMENTS

JP      H1076889      3/1998

*Primary Examiner* — Kiran B Patel
(74) *Attorney, Agent, or Firm* — JCIPRNET

(57) ABSTRACT

The vehicle body includes: a pair of left and right rear side members extending in a front-rear direction of the vehicle body, and a rear bumper beam which extends in a left-right direction of the vehicle body to be coupled to each rear side member at both ends, and bulges rearward toward a center of the left-right direction. The rear bumper beam has an intermediate body extending in the left-right direction at the center of the left-right direction, and inclined bodies which are displaced forward as expanding to the left and right toward the respectively corresponding rear side member from both ends of the intermediate body. A rearward surface of the intermediate body includes a vertical surface, and an inclined surface which is continuous from at least either an upper end or a lower end of the vertical surface and is displaced forward as separating from the vertical surface.

6 Claims, 7 Drawing Sheets

(56) References Cited

U.S. PATENT DOCUMENTS

| | | | | |
|---|---|---|---|---|
| 4,998,761 | A | * | 3/1991 | Bayer ................ B60R 19/18 293/121 |
| 5,201,912 | A | * | 4/1993 | Terada ............... B60R 19/18 293/133 |
| 5,934,544 | A | * | 8/1999 | Lee .................. B60R 19/18 72/181 |

* cited by examiner

VEHICLE BODY

CROSS-REFERENCE TO RELATED APPLICATION

This application claims the priority benefits of Japanese application no. 2020-046802, filed on Mar. 17, 2020. The entirety of the above-mentioned patent application is hereby incorporated by reference herein and made a part of this specification.

BACKGROUND

Technical Field

The disclosure relates to a vehicle body including a pair of left and right rear side members extending in a front-rear direction of the vehicle body, and a rear bumper beam which extends in a left-right direction of the vehicle body to be coupled to each rear side member at both ends and bulges rearward toward a center of the left-right direction.

Related Art

Patent literature 1 (Japanese Patent Laid-open No. 10-76889) discloses a rear bumper beam which is coupled to rear side members extending in a front-rear direction at both left and right ends. The rear bumper beam has a curved shape which bulges rearward toward a center of the left-right direction over an entire region in a left-right direction.

Although the curved shape has high rigidity against a load toward a curvature center, when a vehicle body is collided from the rear with an offset, a collision object (for example, a barrier in the U.S. Rear Collision Regulation FMVSS301R) comes into contact with the curved shape in a wide range of the offset, and thus the collision load is concentrated on the rear side member on the offset side, and the vehicle body may be greatly deformed.

The disclosure provides a vehicle body capable of distributing a collision load to left and right rear side members as evenly as possible even in an offset rear collision.

SUMMARY

According to a first aspect of the disclosure, a vehicle body includes: a pair of left and right rear side members extending in a front-rear direction of a vehicle body, and a rear bumper beam which extends in a left-right direction of the vehicle body to be coupled to each rear side member at both ends and bulges rearward toward a center of the left-right direction, wherein the rear bumper beam has an intermediate body extending in the left-right direction at the center of the left-right direction, and inclined bodies which are displaced forward as expanding to the left and right toward the respectively corresponding rear side member from both ends of the intermediate body, wherein a rearward surface of the intermediate body includes a vertical surface, and an inclined surface which is continuous from at least either an upper end or a lower end of the vertical surface and is displaced forward as separating from the vertical surface.

According to a second aspect, in addition to the configuration of the first aspect, the rear bumper beam includes a beam main body which is formed by an extrusion molded body in which an extrusion direction is aligned to the left-right direction of the vehicle body, and a reinforcing member which is coupled to the beam main body from the rear and forms the vertical surface and the inclined surface.

According to a third aspect, in addition to the configuration of the second aspect, on a rear surface of the beam main body, a concave portion is arranged which is recessed forward from upper and lower ends of the inclined surface, extends in the left-right direction of the vehicle body and is closed by the reinforcing member.

According to a fourth aspect, in addition to the configuration of the third aspect, in the concave portion, a ridge line extending in the left-right direction of the vehicle body is defined between an upper end and a lower end of the concave portion.

According to a fifth aspect, in addition to the configuration of any one of the second aspect to the fourth aspect, at each of left and right ends of the beam main body, a crushing region is shaped which is formed in a corrugated shape having a generatrix in the left-right direction of the vehicle body by crushing the extrusion molded body in a front-rear direction of the vehicle body, and is coupled to the rear side member from the rear.

According to a sixth aspect, in addition to the configuration of any one of the first aspect to the fifth aspect, the rear bumper beam has higher strength than the rear side member and a hard barrier which is defined in the U.S. Rear Collision Regulation.

According to a seventh aspect, in addition to the configuration of any one of the first aspect to the sixth aspect, the rear bumper beam has a rectangular closed cross section longer in a front-rear direction than in an up-down direction. Here, the closed cross section is formed for each unpartitioned space in a cross-sectional shape of the rear bumper beam.

Figure 4:
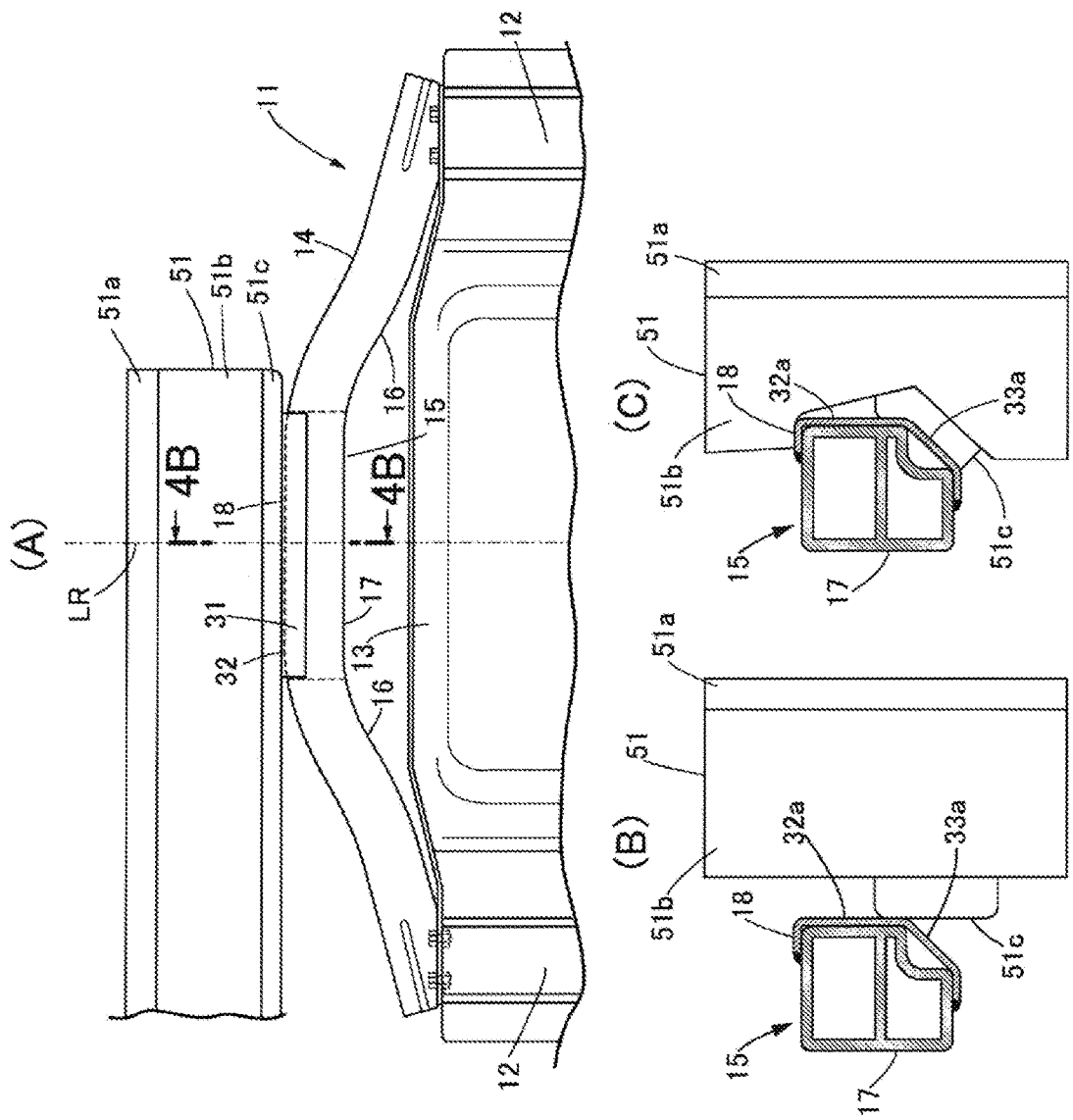

(A) of FIG. 4 is a plan view showing a rear part structure in which the vehicle body is collided from the rear with an offset, (B) of FIG. 4 is a cross-sectional view in which the vehicle body is cut at a bilaterally symmetrical surface, and (C) of FIG. 4 is a cross-sectional view of a hard barrier in contact with an inclined surface.

Figure 5:
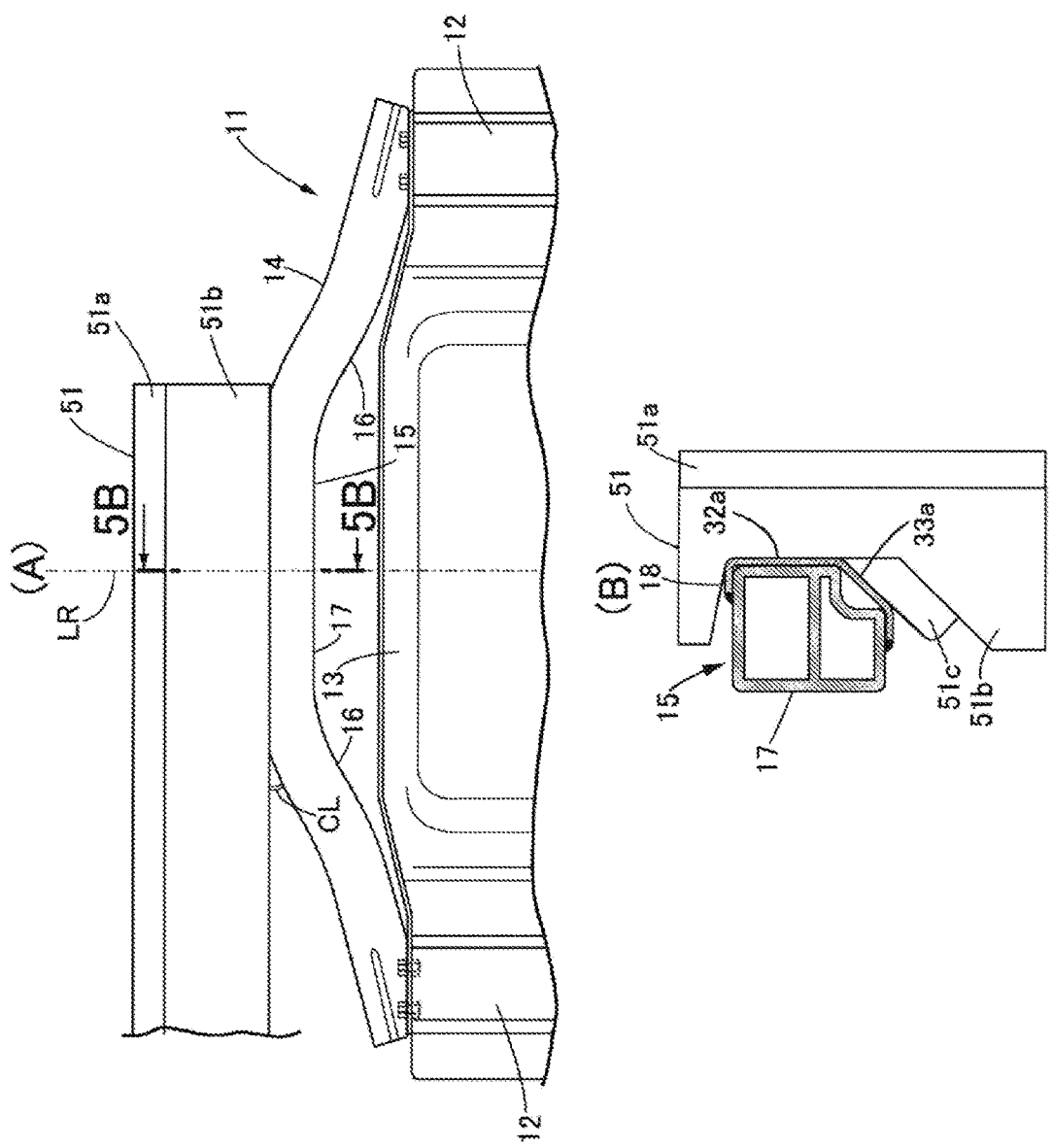

(A) of FIG. 5 is a plan view of a soft barrier in contact with a vertical surface, and (B) of FIG. 5 is a cross-sectional view of the soft barrier in contact with the vertical surface.

Figure 6:
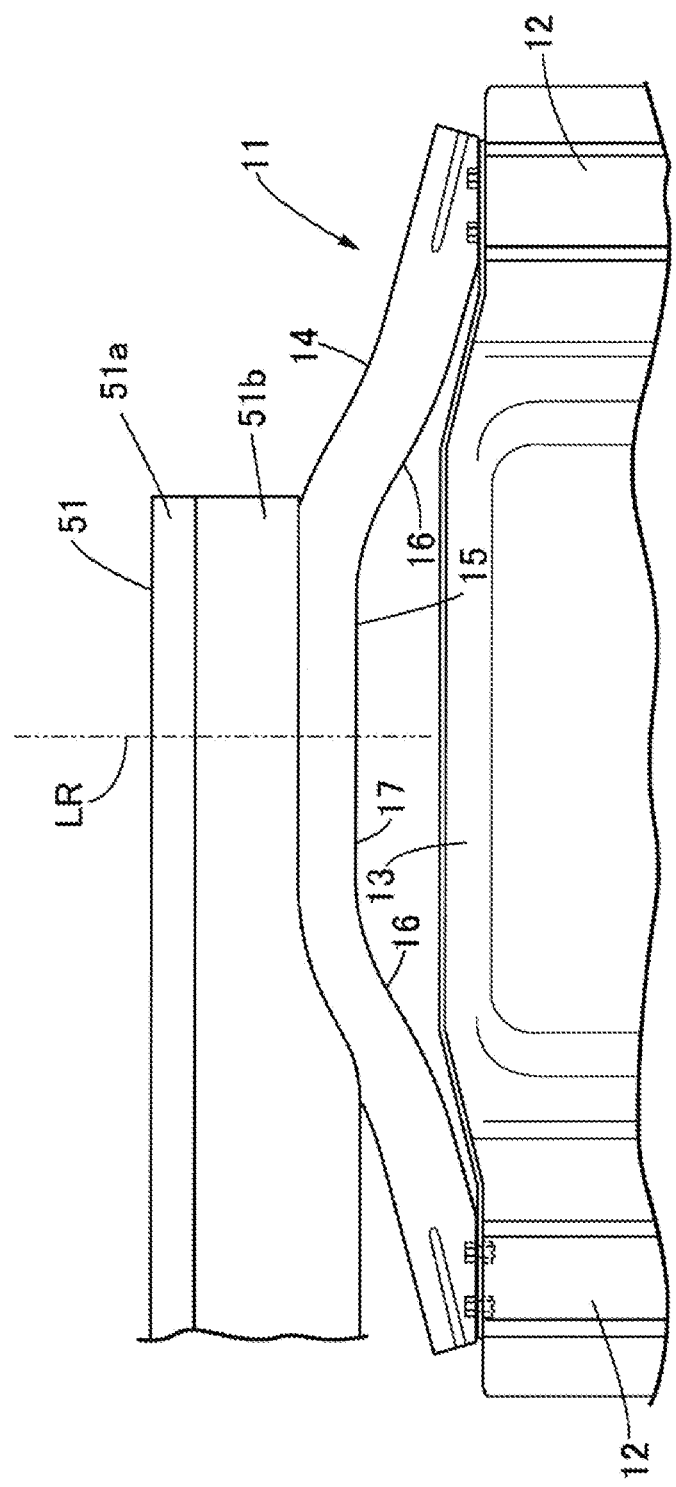

FIG. 6 is a plan view of the soft barrier in contact with an inclined body of a rear bumper beam.

Figure 7:
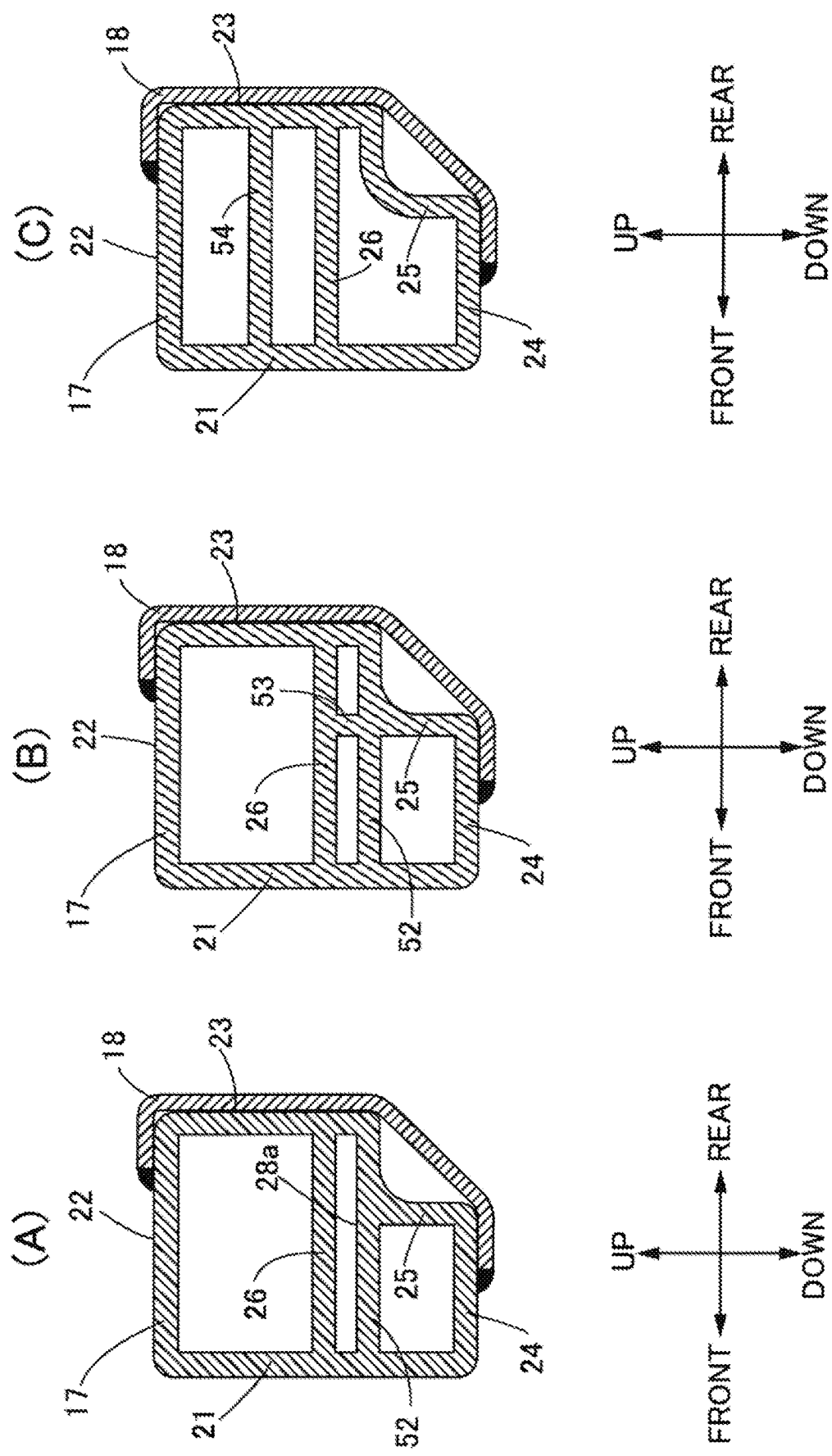

FIG. 7 is a cross-sectional view of a beam main body according to other specific examples.

DESCRIPTION OF THE EMBODIMENTS

According to the first aspect, when the vehicle body is collided from the rear with an offset, the front bumper beam of the following vehicle (for example, equivalent to a "hard barrier" in the U.S. Rear Collision Regulation FMVSS301R) comes into contact with the inclined surface of the intermediate body. The front bumper beam slides on the inclined surface and shifts from the intermediate body of the rear bumper beam in an up-down direction. An impact absorbing component (for example, equivalent to a "soft barrier" in the U.S. Rear Collision Regulation FMVSS301R) such as a radiator arranged at the rear of the front bumper beam and in front of an internal combustion engine bumps into the vertical surface of the intermediate body. Collision energy is absorbed by crushing the impact absorbing component of the following vehicle. At this time, the impact absorbing component is caught by the intermediate body of the rear bumper beam. A clearance is secured between the collision object and the inclined body of the rear bumper beam. Therefore, a load (a collision load) input from the collision object can be evenly distributed to the left and right rear side members.

When the impact absorbing component is sufficiently crushed, the impact absorbing component comes into contact with the inclined body of the rear bumper beam. The bilaterally symmetrical distribution of the load temporarily collapses, and the load concentrates on the rear side member on the offset side. After that, when the impact absorbing component is completely crushed, the internal combustion engine (for example, equivalent to a "flat board surface portion" in the U.S. Rear Collision Regulation FMVSS301R) having higher rigidity than the impact absorbing component comes into contact with the intermediate body of the rear bumper beam. Therefore, the bilaterally symmetrical distribution of the load is restored. The load distributed in this way is supported by the left and right rear side members, and thus the weight of the vehicle body can be reduced as compared with the case where the collision load is concentrated on one of the rear side members.

According to the second aspect, the beam main body of the rear bumper beam can be manufactured by extrusion molding and bending process. When the vertical surface and the inclined surface are established, the reinforcing member is only coupled to the extrusion-molded beam main body, and thus the rear bumper beam can be manufactured relatively easily. Moreover, the reinforcing member may only be coupled in the range of the intermediate body, and the weight increase due to the reinforcing member can be avoided as much as possible.

According to the third aspect, a wall body of the beam main body, which forms the concave portion, and the reinforcing member form a long member having a closed cross section, and thus the strength of the inclined surface can be increased. Passing of the front bumper beam of the following vehicle and the rear bumper beam along the inclined surface can be promoted.

According to the fourth aspect, in the concave portion, a ridge line is added in a central region in addition to ridge lines at the upper and lower ends, and thus the strength and the rigidity of the intermediate body can be increased. The distribution and transmission of the collision load to the rear side member can be improved.

According to the fifth aspect, the rear bumper beam is coupled to the rear end of the rear side member from the rear by the left and right crushing regions, and thus the clearance can be secured between the object colliding with the intermediate body and the inclined body, and a length in the front-rear direction can be reduced at both the left and right ends of the rear bumper beam. Protrusion of the rear bumper beam from the rear side member toward the rear can be suppressed. A freedom degree of layout can be widened. Moreover, the load input from the rear to the rear bumper beam can be efficiently distributed to the two rear side members from the rear bumper beam. The transmission of the load can be secured to be good. A contact area between the inclined body and the rear end of the rear side member can also be secured by an action of the crushing region.

According to the sixth aspect, deformation of the rear side member and the hard barrier during the collision can be promoted. In this way, the collision energy absorption amount can be increased.

According to the seventh aspect, in the intermediate body of the rear bumper beam, the strength in the front-rear direction on the vertical surface and the inclined surface can be increased. A thickness of the rear bumper beam can be reduced. As a result, a weight reduction of the rear bumper beam can be accomplished.

An embodiment of the disclosure is descried below with reference to the attached drawings. Here, the up, down, front, rear, left, and right of a vehicle body are defined based on a sight line of an occupant on an automatic four-wheel vehicle.

Figure 1:
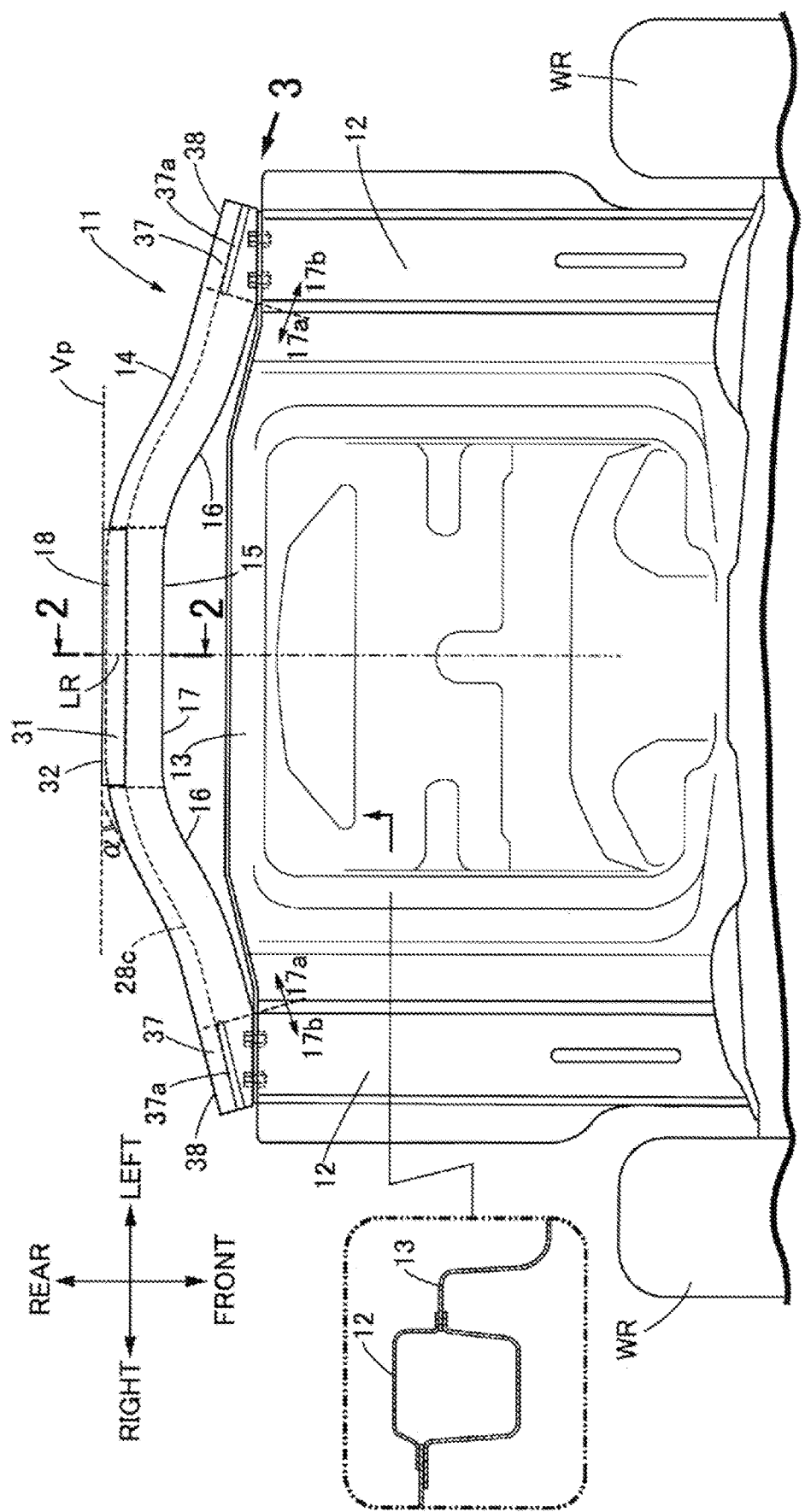
FIG. 1 is a plan view of a rear part structure of a vehicle body according to an embodiment of the disclosure.

FIG. 1 schematically shows a rear part structure of a vehicle body according to an embodiment of the disclosure. A vehicle body 11 includes a pair of left and right rear side members 12 extending in a front-rear direction of the vehicle body at the rear of rear wheels WR, and a floor panel 13 which expands along a horizontal surface between the left and right rear side members 12 and connects the left and right rear side members 12. Each rear side member 12 is formed in a tubular shape showing high rigidity against a buckling load in a front-rear direction. Each rear side member 12 supports a collision load from the rear in the front-rear direction. The rear side members 12 and the floor panel 13 are made of, for example, an iron plate member, and function as an impact absorption material when crushed by the collision load from the rear.

The vehicle body 11 further includes a rear bumper beam 14 which extends in a left-right direction of the vehicle body to be coupled to each rear side member 12 at both ends and bulges rearward toward a center of the left-right direction. The rear bumper beam 14 has an intermediate body 15 extending in the left-right direction at the center of the left-right direction, and inclined bodies 16 which are displaced forward as expanding to the left and right toward the respectively corresponding rear side members 12 from both ends of the intermediate body 15. The rear bumper beam 14 is formed in a bilaterally symmetrical shape with respect to a bilaterally symmetrical surface LR of the vehicle body. The inclined body 16 is formed in a curved shape which curves so as to bulge forward at an intermediate position. An opening angle $\alpha$ of a rear surface of the inclined body 16 is set to 30 degrees or more and 60 degrees or less with respect to a virtual vertical plane Vp which contacts the intermediate body 15 from the rear. Here, the opening angle $\alpha$ refers to an angle of a clearance formed by the rear surface of the inclined body 16 with respect to the virtual vertical plane Vp. The opening angle $\alpha$ can be specified in a linear region of the inclined body 16.

The rear bumper beam 14 includes a beam main body 17 formed by an extrusion molded body in which an extrusion direction is aligned to the left-right direction of the vehicle body, and a reinforcing member 18 coupled to the beam main body 17 from the rear by the intermediate body 15. The extrusion molded body is molded from, for example, a steel material or an aluminum alloy material based on extrusion molding. The beam main body 17 has an original shape region 17a which maintains a cross-sectional shape at the time of the extrusion molding, and crushing regions 17b formed by the extrusion molded body crushed in the front-rear direction of the vehicle body at both left and right ends of the beam main body 17. The beam main body 17 is coupled to the rear end of each rear side member 12 by the crushing regions 17b. For example, bolts can be used during the coupling. In addition, the rear bumper beam 14 may also be molded based on press molding.

Figure 2:
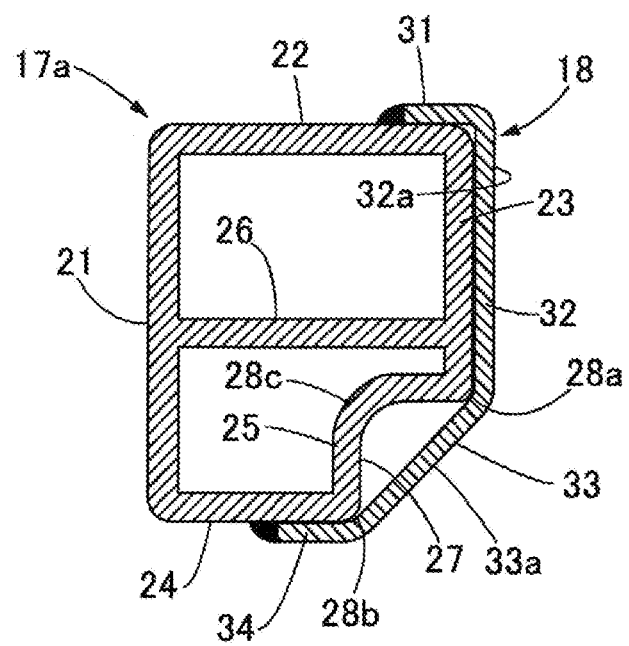
FIG. 2 is a cross-sectional view along Line 2-2 of FIG. 1.
Figure 2:
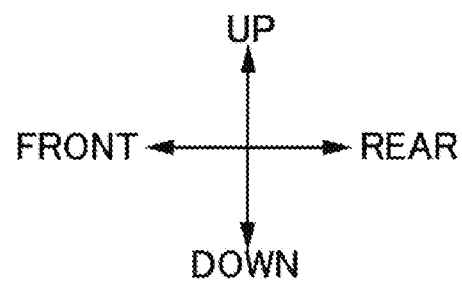

As shown in FIG. 2, the original shape region 17a of the extrusion molded body includes: a front wall 21 expanding along a vertical surface; an upper wall 22 expanding from an upper end of the front wall 21 toward the rear along the horizontal surface; a rear wall 23 expanding downward from a rear end of the upper wall 22 along the vertical surface; a lower wall 24 expanding from a lower end of the front wall 21 toward the rear along the horizontal surface; a curved wall 25 which rises upward from a rear end of the lower wall 24, and is connected to a lower end of the rear wall 23 at the rear end while bending rearward as the curved wall 25 expands upward; and a strut wall 26 which expands along the horizontal surface below the upper wall 22 and connects the rear wall 23 to the front wall 21. The curved wall 25 is recessed forward from the lower end of the rear wall 23 and forms a concave portion 27 extending in the left-right direction of the vehicle body. A ridge line 28a extending along the horizontal surface in the left-right direction of the vehicle body is formed between the curved wall 25 and the rear wall 23, and a ridge line 28b extending along the horizontal surface in the left-right direction of the vehicle body is formed between the curved wall 25 and the lower wall 24. The curved wall 25 has a ridge line 28c extending in the left-right direction of the vehicle body between the rear end connected to the rear wall 23 and the front end connected to the lower wall 24.

The reinforcing member 18 has: a first regulatory plate 31 superposed on the upper wall 22 at the rear end of the upper wall 22; a vertical plate 32 which is continuous from a rear end of the first regulatory plate 31 and is superposed on the rear wall 23 from the rear to form a rearward vertical surface 32a; an inclined plate 33 which is continuous from the lower end of the vertical plate 32 and closes the concave portion 27 to form a rearward inclined surface 33a; and a second regulatory plate 34 which is continuous from a lower end of the inclined plate 33 and is superposed on the lower wall 24 at the rear end of the lower wall 24. The reinforcing member 18 is coupled to the beam main body 17 by, for example, welding. The reinforcing member 18 can be shaped by bending shaping from, for example, a plate member of a steel material or an aluminum alloy material. The concave portion 27 is closed by the inclined plate 33 of the reinforcing member 18. As a result, in the concave portion 27, the ridge line 28c extending in the left-right direction of the vehicle body is set between an upper end and a lower end of the concave portion 27.

Figure 3:
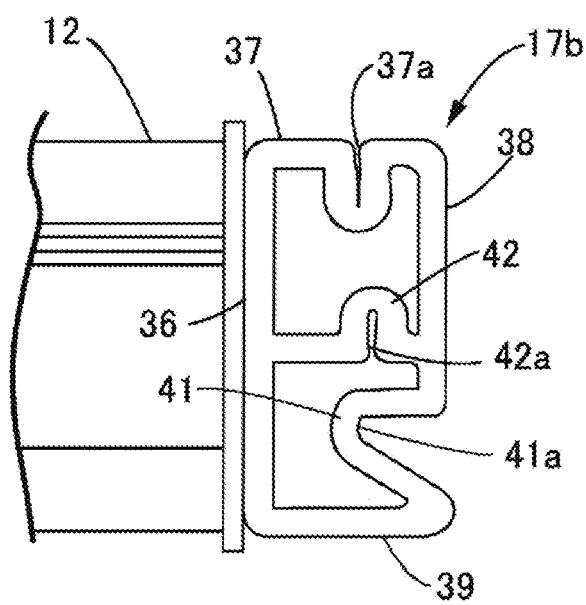
FIG. 3 is a diagram viewing from the direction of Arrow 3 of FIG. 1.
Figure 3:
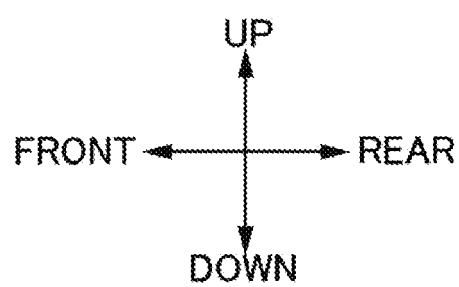

As shown in FIG. 3, the crushing region 17b of the extrusion molded body has: a front wall 36 which is continuous from the front wall 21 of the original shape region 17a in the left-right direction of the vehicle body; an upper corrugated wall 37 which expands rearward from an upper end of the front wall 36, and forms a corrugated shape with a downward recess 37a extending in the left-right direction of the vehicle body; a rear wall 38 which expands downward from a rear end of the upper corrugated wall 37 along the vertical surface; a lower wall 39 which expands rearward along the horizontal surface from the lower end of the front wall 36, and is continuous from the lower wall 24 of the original shape region 17a in the left-right direction of the vehicle body; a longitudinal corrugated wall 41 which is recessed forward between a rear end of the lower wall 39 and a lower end of the rear wall 38, and forms a corrugated shape with a recess 41a extending in the left-right direction of the vehicle body; and a lower corrugated wall 42 which expands rearward from a middle region of the front wall 36 and is connected to the lower end of the rear wall 38 to form a corrugated shape with an upward recess 42a extending in the left-right direction of the vehicle body.

The upper corrugated wall 37 is continuous from the upper wall 22 of the original shape region 17a in the left-right direction of the vehicle body. In the upper corrugated wall 37, the recess 37a is formed in the upper wall 22 of the extrusion molded body which is crushed in the front-rear direction. The longitudinal corrugated wall 41 is continuous from the curved wall 25 of the original shape region 17a in the left-right direction of the vehicle body. In the longitudinal corrugated wall 41, by displacing the rear wall 23 of the extrusion molded body forward, the concave portion 27 is deformed, and the recess 41a is formed. The lower corrugated wall 42 is continuous from the strut wall 26 of the original shape region 17a in the left-right direction of the vehicle body. In the lower corrugated wall 42, the recess 42a is formed in the strut wall 26 of the extrusion molded body which is crushed in the front-rear direction.

Next, an operation of the embodiment is described. Here, the collision is specified based on the U.S. Rear Collision Regulation FMVSS301R. That is, as shown in (A) of FIG. 4, a barrier (a collision object) 51 collides, from the rear, with the vehicle body 11 at a position offset from the bilaterally symmetrical surface LR in the left-right direction of the vehicle body in a straight advancing direction. The barrier 51 has a flat board surface portion 51a having a vertical surface orthogonal to the straight advancing direction. A soft barrier 51b is superposed on the flat board surface portion 51a with a specific thickness (in the straight advancing direction). As shown in (B) of FIG. 4, a position in a height direction and an expansion in the height direction of the soft barrier 51b are set to predetermined values. A hard barrier 51c which is bar-shaped and extends in the horizontal direction is installed on the surface of the soft barrier 51b. A position in the height direction and an expansion in the height direction of the hard barrier 51c are set to predetermined values.

When the vehicle body 11 is collided from the rear with an offset, as shown in (C) of FIG. 4, the hard barrier 51c comes into contact with the inclined surface 33a of the intermediate body 15. The hard barrier 51c slides on the inclined surface 33a and shifts downward from the intermediate body 15 of the rear bumper beam 14. As shown in (B) of FIG. 5, the soft barrier 51b bumps into the vertical surface 32a of the intermediate body 15. Collision energy is absorbed by crushing the soft barrier 51b. At this time, as shown in (A) of FIG. 5, the soft barrier 51b is caught by the intermediate body 15 of the rear bumper beam 14. A clearance CL is secured between the soft barrier 51b and the inclined body 16 of the rear bumper beam 14. Therefore, a load (a collision load) input from the soft barrier 51b can be evenly distributed to the left and right rear side members 12. When the soft barrier 51b is crushed, as shown in FIG. 6, the soft barrier 51b comes into contact with the inclined body 16 of the rear bumper beam 14. The bilaterally symmetrical distribution of the load temporarily collapses, and the load concentrates on the rear side member 12 on the offset side. After that, when the soft barrier 51b is completely crushed, the flat board surface portion 51a having higher rigidity than the soft barrier 51b comes into contact with the intermediate body 15 of the rear bumper beam 14. Therefore, the bilaterally symmetrical distribution of the load is restored. The load distributed in this way is supported by the left and right rear side members 12, and thus the weight of the vehicle body 11 can be reduced as compared with the case where the collision load is concentrated on one of the rear side members 12.

The rear bumper beam 14 according to the embodiment includes the beam main body 17 formed by the extrusion molded body in which the extrusion direction is aligned to the left-right direction of the vehicle body, and the reinforcing member 18 which is coupled to the beam main body 17 from the rear and forms the vertical surface 32a and the inclined surface 33a. The beam main body 17 of the rear bumper beam 14 can be manufactured by extrusion molding and bending process. When the vertical surface 32a and the inclined surface 33a are established, the reinforcing member 18 is only coupled to the extrusion-molded beam main body 17, and thus the rear bumper beam 14 can be manufactured relatively easily. Moreover, the reinforcing member 18 may only be coupled in the range of the intermediate body 15, and the weight increase due to the reinforcing member 18 can be avoided as much as possible.

In the embodiment, on the rear surface of the beam main body 17, the concave portion 27 is arranged, which is recessed forward from the upper and lower ends of the inclined surface 33a, extends in the left-right direction of the vehicle body and is closed by the reinforcing member 18. The curved wall (a wall body) 25 of the beam main body 17, which forms the concave portion 27, and the reinforcing member 18 form a long member having a closed cross section, and thus the strength of the inclined surface 33a can be increased. Passing of the hard barrier and the rear bumper beam 14 along the inclined surface 33a can be promoted.

In the concave portion 27 of the beam main body 17, the ridge line 28c extending in the left-right direction of the vehicle body between the upper end and the lower end of the concave portion 27 is defined. In the concave portion 27, the ridge line 28c is added in the central region in addition to the ridge line 28a at the upper end and the ridge line 28b at the lower end, and thus the strength and the rigidity of the intermediate body 15 can be increased. The distribution and transmission of the collision load to the rear side members 12 can be improved.

At each of the left and right ends of the beam main body 17, the crushing region 17b is shaped which is formed in a corrugated shape having a generatrix in the left-right direction of the vehicle body by crushing the extrusion molded body of the beam main body 17 in the front-rear direction of the vehicle body, and is coupled to the rear side members 12 from the rear. Because the rear bumper beam 14 is coupled to the rear ends of the rear side members 12 from the rear by the left and right crushing regions 17b, the clearance CL can be secured between the rear bumper beam 14 and the virtual vertical plane Vp, and the length in the front-rear direction can be reduced at both the left and right ends of the rear bumper beam 14. Protrusion of the rear bumper beam 14 from the rear side members 12 toward the rear can be suppressed. A freedom degree of layout can be widened. Moreover, the strength can be increased by the crushing region 17b, and the load input from the rear to the rear bumper beam 14 can be efficiently distributed to the two rear side members 12 from the rear bumper beam 14. The transmission of the load can be secured to be good.

The rear bumper beam 14 has higher strength than the rear side member 12 and the hard barrier. Deformation of the rear side member 12 and the hard barrier can be promoted during the collision. In this way, the collision energy absorption amount can be increased.

In addition, the rear bumper beam 14 may have a rectangular closed cross section longer in the front-rear direction than in the up-down direction. Here, the closed cross section is formed for each unpartitioned space in the cross-sectional shape of the rear bumper beam 14. When the rectangular closed cross section is formed, for example, as shown in (A) of FIG. 7, in the beam main body 17, a reinforcing wall 52 may be formed, which expands along the horizontal surface between the strut wall 26 and the lower wall 24 and connects the ridge line 28c of the curved wall 25 to the front wall 21. As shown in (B) of FIG. 7, in the beam main body 17, a longitudinal reinforcing wall 53 may be further formed, which rises from a rear end of the reinforcing wall along the vertical surface and connects the ridge line 28c of the curved wall 25 to the strut wall 26. As shown in (C) of FIG. 7, in the beam main body 17, instead of the reinforcing wall 52 and the longitudinal reinforcing wall 53, a reinforcing wall 54 may be formed, which extends along the horizontal surface between the upper wall 22 and the strut wall 26 and connects the rear wall 23 to the front wall 21. In any case, in the intermediate body 15 of the rear bumper beam 14, the strength in the front-rear direction on the vertical surface 32a and the inclined surface 33a can be increased. A thickness of the rear bumper beam 14 can be reduced. As a result, a weight reduction of the rear bumper beam 14 can be achieved.

What is claimed is:

1. A vehicle body, which is a vehicle body (11) comprising: a pair of left and right rear side members (12) extending in a front-rear direction of the vehicle body, and
a rear bumper beam (14) which extends in a left-right direction of the vehicle body to be coupled to each rear side member (12) at both ends and bulges rearward toward a center of the left-right direction, wherein
the rear bumper beam (14) comprises an intermediate body (15) extending in the left-right direction at the center of the left-right direction, and
inclined bodies (16) which are displaced forward as expanding to the left and right toward the respectively corresponding rear side members (12) from both ends of the intermediate body (15), wherein
a rearward surface of the intermediate body (15) comprises a vertical surface (32a), and an inclined surface (33a) which is continuous from at least either an upper end or a lower end of the vertical surface (32a) and is displaced forward as separating from the vertical surface (32a).

2. The vehicle body according to claim 1, wherein the rear bumper beam (14) comprises a beam main body (17) which is formed by an extrusion molded body in which an extrusion direction is aligned to the left-right direction of the vehicle body, and a reinforcing member (18) which is coupled to the beam main body (17) from the rear and forms the vertical surface (32a) and the inclined surface (33a).

3. The vehicle body according to claim 2, wherein on a rear surface of the beam main body (17), a concave portion (27) is arranged which is recessed forward from upper and lower ends of the inclined surface (33a), extends in the left-right direction of the vehicle body and is closed by the reinforcing member (18).

4. The vehicle body according to claim 3, wherein in the concave portion (27), a ridge line (28c) extending in the left-right direction of the vehicle body is defined between an upper end and a lower end of the concave portion (27).

5. The vehicle body according to claim 2, wherein at each of left and right ends of the beam main body (17), a crushing region (17b) is shaped which is formed in a corrugated shape having a generatrix in the left-right direction of the vehicle body by crushing the extrusion molded body in a front-rear direction of the vehicle body, and is coupled to the rear side member (12) from the rear.

6. The vehicle body according to claim 1, wherein the rear bumper beam (14) has a rectangular closed cross section longer in a front-rear direction than in an up-down direction.

\* \* \* \* \*